(12) United States Patent
Ein-Eli et al.

(10) Patent No.: US 6,544,686 B1
(45) Date of Patent: Apr. 8, 2003

(54) METAL-ALKALINE BATTERY CELLS WITH REDUCED CORROSION RATES

(75) Inventors: Yair Ein-Eli, Bet Shemesh (IL); Chen Menachem, Holon (IL); Yuli Zingerman, Bet Shemesh (IL)

(73) Assignee: Electric Fuel Limited, Bet Shemesh (IL)

( * ) Notice: Subject to any disclaimer, the term of this patent is extended or adjusted under 35 U.S.C. 154(b) by 102 days.

(21) Appl. No.: 09/718,438

(22) Filed: Nov. 22, 2000

Related U.S. Application Data

(60) Provisional application No. 60/249,852, filed on Nov. 17, 2000.

(51) Int. Cl.[7] .......................... H01M 4/06; H01M 4/62; H01M 12/06
(52) U.S. Cl. .................. 429/206; 429/216; 429/217; 429/229; 429/27
(58) Field of Search ............................... 429/229, 216, 429/217, 206, 27

(56) References Cited

U.S. PATENT DOCUMENTS

| | | | | |
|---|---|---|---|---|
| 5,168,018 A | * | 12/1992 | Yoshizawa et al. | 429/206 |
| 5,270,128 A | * | 12/1993 | Reichert et al. | 429/134 |
| 5,364,715 A | * | 11/1994 | Getz et al. | 429/206 |
| 5,401,590 A | * | 3/1995 | Chalilpoyil et al. | 429/212 |
| 5,888,666 A | * | 3/1999 | Kawakami | 429/145 |

* cited by examiner

*Primary Examiner*—Carol Chaney
(74) *Attorney, Agent, or Firm*—Proskauer Rose LLP

(57) ABSTRACT

A metal-alkaline battery having a reduced corrosion rate and enhanced electrochemical properties comprises an anode that includes derivatives of polyethylene glycol (PEG). The PEG derivatives have one or more hydrophilic moieties attached to the ends of the PEG chain. The hydrophilic moieties may be a carboxyl group or a carboxymethyl group. A preferred PEG derivative is polyethylene glycol, bi-carboxy methyl ether (PEG BCME).

25 Claims, No Drawings

METAL-ALKALINE BATTERY CELLS WITH REDUCED CORROSION RATES

This application claims the benefit of U.S. Provisional Patent Application No. 60/249,852, filed on Nov. 17, 2000.

BACKGROUND

Metal-alkaline cells are widely used as convenient and efficient sources of stored electrochemical energy. In particular, zinc-alkaline batteries are safe, lightweight, inexpensive, and have a high energy density. Zinc-alkaline batteries are available in the form of both primary (non-rechargeable) and secondary (rechargeable) batteries. Consequently, zinc-alkaline batteries are an extremely popular source of electrochemical energy and are used in a wide variety of applications, ranging from automobiles to portable electrical devices, such as cellular telephones.

In recent years, zinc-air cells have emerged as one of the most popular types of metal-alkaline batteries. Like zinc-metal batteries, zinc-air cells have extremely high energy density, and are safe, lightweight and inexpensive. A zinc-air battery generally comprises an air cathode; a separator film; and an anode mixture comprising an electrolyte and zinc metal particles. A first terminal is electrically connected to the air electrode, and a second terminal is in electrical contact with the anode mixture. The separator film is in contact with both the mixture and the air cathode and separates the two, while allowing ions (i.e., the electrolyte) to travel between the two. The zinc-air battery container also usually has one or more holes to allow air flow from the atmosphere.

Unlike most batteries, a zinc-air battery has only a single consumable electrode—the zinc anode. The zinc anode of a zinc-air cell is typically formed into a gel by adding conventional gelling agents to a mixture comprising an alkaline electrolyte (i.e., KOH), zinc metal particles (i.e., ZnO particles), and a corrosion inhibitor. The gel holds the zinc particles in place, allowing the zinc particles to contact and interact with each other. The cathode usually comprises a layer of active carbon, an oxygen-reducing catalyst, a binder, a metal collector, and a guard layer. Oxygen-reducing catalysts convert oxygen from air into hydroxyl ions, which then oxidize the anode. Electrons are then liberated from the anode.

While zinc-air cells are useful in a wide variety of applications, they also suffer from a number of disadvantages. In particular, zinc-air cells exhibit a high rate of anode corrosion, which over time depletes the battery of stored energy. Typically, the zinc anode in the zinc-air cell reacts with air and other elements in the battery to corrode spontaneously, producing hydrogen as a by-product. Corrosion of zinc-air batteries is exacerbated at elevated storage temperatures. Furthermore, if not permitted to escape from the casing of the cell, the hydrogen gas produced during the corrosion reaction can cause buildup of internal pressure in the cell, and can lead to electrical shorts, swelling, and leaks.

To reduce corrosion rates in zinc-alkaline batteries, various corrosion inhibitors have been tried. For example, mercury has in the past been a widely used corrosion inhibitor. Mercury reduces hydrogen gas production, and thereby reduces the rate of zinc corrosion. As a result, in the presence of mercury the battery life and the stability of the cell are greatly increased. However, because of environmental and safety concerns, mercury is no longer preferable as a corrosion inhibitor.

Numerous other corrosion inhibitors besides mercury, such as metallic materials, organic surfactants, and non-organic materials, have also been used. In the realm of organic surfactant corrosion inhibitors, polyethylene glycol ("PEG") has been discovered to be useful to inhibit corrosion in zinc-alkaline batteries. PEG has a general chemical formula of $[HO-(CH_2-CH_2-O)_n-H]$. PEG is added to the gelling mixture during the production of the Zn anode and coats the zinc particles, reducing exposure of the Zn metal to electrolytes and thereby inhibiting corrosion.

Although PEG is an effective corrosion inhibitor, it suffers from significant disadvantages. PEG is unstable in the alkaline solution of a zinc-alkaline battery. In addition, PEG does not dissolve well in the alkaline electrolyte emulsions of KOH, water, zinc, and gelling agents used in creating the anode mixture, producing a phase separation. As a result of its low solubility, PEG may deposit on the sides of the mixing container during preparation of the cathode gel mixture, making consistent manufacture of the zinc anode difficult. Moreover, with prolonged storage PEG gradually separates from the zinc particles in the anode, thereby reducing its effectiveness as a corrosion inhibitor.

A further drawback of conventional corrosion inhibitors is that in general, batteries with reduced corrosion rates exhibit reduced electrical capacity and working potential. Although reduced corrosion rates are desirable to enhance battery life, batteries with reduced electrical capacity and working potential are not desirable. Consequently, there is a long-standing need for a corrosion inhibitor for use with metallic-alkaline batteries, specifically with zinc-air batteries, that possess comparable corrosion-inhibiting properties to that of PEG, but which does not share its disadvantages.

SUMMARY OF THE INVENTION

The present invention is a method of reducing corrosion in zinc-alkaline battery cells, such as zinc-air cells, that comprises incorporating derivatives of polyethylene glycol (PEG) having hydrophilic moieties attached to the ends of the PEG chains into the anode of such cells. By incorporating PEG derivatives having hydrophilic moieties attached to the ends of the PEG chains into the anode of such cells, the corrosion rates of the zinc anodes are reduced, and both the storage life of the battery and the electrochemical performance of such batteries are increased. In a preferred embodiment, the corrosion inhibitor is polyethylene glycol, bi-carboxy methyl ether (PEG BCME). The present invention also relates to a zinc alkaline battery containing a zinc anode that incorporates a corrosion inhibitor comprising PEG containing hydrophilic moieties attached to the ends of the PEG chains.

Accordingly, it is an objective of the present invention to provide a metal-alkaline battery cell comprising a cathode including a catalyst and a conductive material; a first terminal electrically connected to the cathode; a mixture comprising an electrolyte, a metal, and a PEG derivative, the electrolyte comprising at least one ion, the PEG derivative having a hydrophilic moiety attached to at least one terminal hydroxyl group of a PEG molecule; a second terminal electrically connected to the mixture; and a separator, the separator being in contact with each of the cathode and the mixture while separating the cathode and the mixture from each other, and allowing the at least one ion in the electrolyte to travel between the mixture and the cathode.

It is another objective of the present invention to provide a zinc-air battery cell comprising a first terminal electrically connected to an air electrode; a mixture comprising an electrolyte, zinc metal particles, and PEG BCME, the electrolyte comprising at least one ion; a second terminal electrically connected to the mixture; and a separator, the separator being in contact with each of the electrode and the mixture while separating the electrode and the mixture from each other, and allowing the at least one ion in the electrolyte to travel between the mixture and the electrode.

It is another objective of the present invention to provide a method of making a metal-air battery cell, comprising the steps of obtaining an air electrode with a first terminal connected thereto; mixing an electrolyte, metal particles, and PEG BCME to create a mixture, the electrolyte comprising at least one ion; electrically connecting a second terminal to the mixture; and positioning a separator between the air electrode and the mixture, the separator being in physical contact with the air electrode and with the mixture while separating the electrode and the mixture from each other, and allowing the at least one ion to travel between the air electrode and the mixture.

DETAILED DESCRIPTION OF THE PREFERRED EMBODIMENTS

The present invention is a metal alkaline battery that incorporates an improved corrosion inhibitor in the anode. Unlike conventional corrosion inhibitors, the corrosion inhibitor of the present invention reduces corrosion and enhances storage life while retaining a high level of electrochemical performance. The corrosion inhibitor comprises PEG modified by addition of hydrophilic moieties at the ends of the PEG chains. In a preferred embodiment, the corrosion inhibitor is polyethylene glycol, bi-carboxy methyl ether (PEG BCME). The present invention is also directed to a method for making a metal alkaline battery that exhibits reduced corrosion, enhanced storage life, and an extended high level of performance. Zn-alkaline batteries containing PEG BCME incur reduced corrosion in comparison to Zn-alkaline batteries containing PEG. It has also been found that zinc-alkaline batteries containing PEG BCME surprisingly do not exhibit the usual reduction in electrical capacity and working potential seen in batteries having reduced corrosion rates. Furthermore, because corrosion of such cells is inhibited in the presence of the corrosion inhibitor of the present invention, hydrogen production is also reduced, and therefore swelling, leaks and electrical shorts are reduced in such zinc-alkaline cells.

The corrosion inhibitor of the present invention is a modified PEG molecule comprising made hydrophilic moieties attached via the hydroxyl groups at the ends of a polyethyl glycol (PEG) chain. The hydrophilic moieties may be any that are effective to neutralize the effects of the alkaline electrolyte solution. Preferably, the hydrophilic moieties are carboxyl ($COO^-$) groups, or more preferably, carboxymethyl ($CH_3-COO^-$) groups. Other groups that could be employed include carboxyethyl ($CH_3-CH_2-COO^-$), carboxypropyl ($CH_3-CH_2-CH_2-COO^-$), and carboxybutyl ($CH_3-CH_2-CH_2-CH_2-COO^-$), groups; amino, aminomethyl, aminoethyl, aminopropyl, and aminobutyl groups; and methyl-, ethyl-, propyl-, and butylphosphoesters, and methyl-, ethyl-, propyl-, and butylthiols. Where carboxymethyl groups are attached to the PEG chain, the corrosion inhibitor produced is polyethylene glycol bicarboxy methyl ether (PEG-BCME) (also called polyethylene glycol bis(carboxymethyl)ether). PEG BCME has a general chemical formula of $HO_2CCH_2O-(CH_2-CH_2-O)_n-CH_2CO_2H$. The value of n in the formula for PEG BCME is preferably in a range between 5 and 50, and the molecular weight is preferably in a range between 200 and 2,000. In a particularly preferred embodiment, n=11; in another particularly preferred embodiment, the PEG BCME has a molecular weight of 600. An appropriate amount of the corrosion inhibitor is added to the zinc anode mixture. The amount of PEG BCME added is preferably sufficient to make a final PEG BCME concentration between about 50 and about 5,000 ppm, and more preferably is in an amount sufficient to make a final PEG BCME concentration between about 200 ppm and about 1,500 ppm.

As noted above, an anode mixture for a metal alkaline battery contains an alkaline electrolyte, usually KOH. In such an anode mixture, the $COO^-$ portions of PEG BCME interact with $K^+$ ions from the KOH salt to form a more stable emulsion than is possible in the presence of PEG. As a result, PEG BCME dissolves more readily in the alkaline electrolyte solution than PEG. Furthermore, unlike PEG, PEG BCME does not precipitate onto the walls of the mixing container during preparation of the anode mixture, leading to a more consistent anode preparation that is suitable for manufacturing.

The invention is further disclosed by the following Examples, which are intended to serve for illustrative purposes and are not intended to limit the scope of the invention.

EXAMPLES

To demonstrate the superior-corrosion inhibiting properties of PEG BCME, zinc-air cells with anodes containing PEG BCME were prepared and compared to zinc-air cells with anodes containing PEG. Zinc-air batteries with anodes containing PEG BCME and batteries with anodes containing PEG were tested for electrical capacity, working potential, and corrosion rates. PEG having a chemical formula of $HO-(CH_2-CH_2-O)_{14}H$ was compared to PEG BCME having a chemical formula of $HO_2CCH_2O-(CH_2-CH_2-O)_{11}CH_2CO_2H$. The molecular weight of these species of PEG and PEG BCME was 600. Zinc anodes containing KOH as the electrolyte; InOH; ZnO particles; and carbapol as the gelling agent were constructed, and the amounts and type of corrosion inhibitor was added as indicated. PEG was incorporated into the anode mixtures at a concentration of 200 ppm (parts per million) and 500 ppm, and PEG BCME was tested at concentrations of 200 ppm, 500 ppm, 1000 ppm, and 1500 ppm. Because of the significant drop in electrical capacity and potential in Zn-air cells containing anodes having PEG at concentrations of 1000 ppm and above, these cells could not be used for comparison with cells containing PEG BCME. For most of the Examples, cells with anodes containing PEG at 200 ppm were compared to cells with anodes containing PEG BCME at 500 ppm. However, cells with anodes containing 200 ppm PEG were also compared directly to cells with anodes containing 200 ppm PEG BCME, and cells with anodes containing 500 ppm PEG BCME were compared directly to cells with anodes containing 500 ppm PEG.

In Examples 1–12, zinc-air cells were stored for a number of days and then tested in either a GSM (global system for mobile phone) discharge mode or in an analog discharge mode. GSM discharge mode is a standardized pulse test used in the cellular telephone industry for testing cellular phone batteries. GSM discharge mode mimics normal cellular telephone usage, which alternates between a very high pulse and a very low pulse. The high pulse simulates cellular phone usage where a cellular antennae tower is distant from the user. The low pulse mimics a stand-by condition of cellular phones. The high pulse was simulated by a high current level of 2 A that was discharged for 0.4 msec. The low pulse was simulated by a low current level of 0.2 A that was discharged for 3.6 msec. Electrical potential measured in GSM mode was expressed as Vplat and Vdip. Vplat measures the highest working potential of the battery at a current of 2 A. Vdip measures the minimum potential measurements after 20% discharge at a current of 0.2 A. Zinc-air batteries were also tested in the analog discharge mode at uniform pulse of 0.47 A. The pulse in analog discharge mode was constant over time.

Examples 1–12 demonstrate that the electrochemical properties of Zn-air batteries containing PEG BCME are superior to those of Zn-air batteries containing PEG. Zn-air batteries containing PEG BCME repeatedly exhibited higher capacity and potential measurements, whether measurements were made under the GSM discharge mode or the analog discharge mode, made under different measurement temperatures, made with identical or different PEG and PEG BCME concentrations, or made after various lengths of storage time.

By comparing the electrical performances of cells containing PEG at 200 ppm and 500 ppm, it can be seen that significantly higher capacity and potential measurements were recorded at the lower concentration of 200 ppm than at 500 ppm PEG (compare Tables 4 and 6 to Table 5; Table 9 to Table 10). Because of the higher measurements, PEG at concentrations of 200 ppm only was used for comparison in many of these examples. Also, potential drop (Vdip) at concentrations greater than 500 ppm were too great to be useful under experimental conditions.

Example 1(a)

Zinc-air cells with zinc anodes containing PEG at 200 ppm or PEG BCME at 500 ppm were stored for 14 days, and then the effectiveness of the corrosion inhibitors was measured at room temperature. Measurements of electrical capacity and potential were made under GSM discharge mode (0.2 A for 3.6 msec+2 A for 0.4 msec). Electrical potential was expressed as either Vplat or Vdip. Vplat represents the highest working potential of the battery at a current of 2 A. Vdip represents the minimum potential measurements after 20% discharge at a current of 0.2 A. Electrical capacity measures the amount of electrical energy delivered before the voltage drops below the cut-off voltage, and is expressed as Ah. Three separate cells were constructed for each cell type and tested, and the results for each cell were averaged. Both the results for each cell tested and the averaged values are reported.

TABLE 1

| Cell | Corrosion Inhibitor | Capacity to 0.8 V Cut-off (Ah) Raw Data | Mean | Vplat (V) Raw Data | Mean | Vdip (V) Raw Data | Mean |
|---|---|---|---|---|---|---|---|
| 1-1 | PEG (200 ppm) | 3.22 | 3.26 | 0.95 | 0.96 | 0.88 | 0.91 |
| 1-2 | PEG (200 ppm) | 3.52 | | 0.97 | | 0.93 | |
| 1-3 | PEG (200 ppm) | 3.04 | | 0.96 | | 0.93 | |
| 1-4 | PEG BCME (500 ppm) | 3.65 | 3.71 | 1.02 | 1.01 | 0.98 | 0.98 |
| 1-5 | PEG BCME (500 ppm) | 3.77 | | 1.00 | | 0.97 | |
| 1-6 | PEG BCME (500 ppm) | 3.72 | | 1.02 | | 0.98 | |

Referring now to Table 1, after 14 days of storage, the average capacity to the cut-off voltage of 0.8 V was 3.71 Ah for cells with anodes containing PEG BCME (cells 1-4 to 1-6), compared to 3.26 Ah for cells with anodes containing PEG (cells 1-1 to 1-3). Further, average electrocal potential measurements of Vplat and Vdip for cells containing PEG BCME, at 1.01 V and 0.98 V, respectively, were greater than those of cells containing PEG, at 0.96 V and 0.91V, respectively. Thus, the electrical properties of Zn-air cells containing PEG BCME in the Zn anode were greater than those of Zn-air cells containing PEG in the anode.

Example 1(b)

Zinc-air cells with anodes containing PEG at 200 ppm were directly compared to cells with anodes containing 200 ppm PEG BCME. The cells were stored for 14 days, and then the effectiveness of the corrosion inhibitors was measured at room temperature. Measurements were made under GSM discharge mode (0.2 A for 3.6 msec+2 A for 0.4 msec).

TABLE 2

| Cell | Corrosion Inhibitor | Capacity to 0.8 V Cut-off (Ah) Raw Data | Mean | Vplat (V) Raw Data | Mean | Vdip (V) Raw Data | Mean |
|---|---|---|---|---|---|---|---|
| 2-1 | PEG (200 ppm) | 3.22 | 3.26 | 0.95 | 0.96 | 0.88 | 0.91 |
| 2-2 | PEG (200 ppm) | 3.52 | | 0.97 | | 0.93 | |
| 2-3 | PEG (200 ppm) | 3.04 | | 0.96 | | 0.93 | |
| 2-4 | PEG BCME (500 ppm) | 3.75 | 3.73 | 1.06 | 1.08 | 1.05 | 1.06 |
| 2-5 | PEG BCME (500 ppm) | 3.71 | | 1.08 | | 1.06 | |
| 2-6 | PEG BCME (500 ppm) | 3.71 | | 1.09 | | 1.07 | |

In this Example, the experimental conditions were identical to those of Example 1(a), except that the anodes were tested with both PEG and PEG BCME at a concentration of 200 ppm. Referring now to Table 2, electrical capacity to the cut-off voltage of 0.8 V averaged 3.73 Ah for cells containing 200 ppm PEG BCME in the anode (cells 2-4 to 2-6), as compared to only 3.26 Ah for cells containing 200 ppm PEG (cells 2-1 to 2-3). Average measurements of Vplat and Vdip for cells containing PEG BCME in the anode, at 1.08 V and 1.06 V, respectively, were greater than those for cells containing PEG in the anode, at 0.96 V and 0.91V. Thus, even at the same concentrations, zinc-air cells containing PEG BCME in the anode produced superior electrochemical properties in comparison to zinc-air cells containing PEG in the anode.

Example 2

Zinc-air cells with anodes containing PEG at 200 ppm or PEG BCME at 500 ppm were stored for 34 days at room temperature, and then measured in a GSM discharge mode (0.2 A for 3.6 msec+2 A for 0.4 msec).

TABLE 3

| Cell | Corrosion Inhibitor | Capacity to 0.8 V Cut-off (Ah) | | Vplat (V) | | Vdip (V) | |
|---|---|---|---|---|---|---|---|
| | | Raw Data | Mean | Raw Data | Mean | Raw Data | Mean |
| 3-1 | PEG (200 ppm) | 3.55 | 3.51 | 0.95 | 0.95 | 0.89 | 0.90 |
| 3-2 | PEG (200 ppm) | 3.45 | | 0.94 | | 0.89 | |
| 3-3 | PEG (200 ppm) | 3.54 | | 0.97 | | 0.91 | |
| 3-4 | PEG BCME (500 ppm) | 3.71 | 3.69 | 0.96 | 0.96 | 0.93 | 0.94 |
| 3-5 | PEG BCME (500 ppm) | 3.71 | | 0.97 | | 0.94 | |
| 3-6 | PEG BCME (500 ppm) | 3.66 | | 0.97 | | 0.94 | |

In Example 2, the batteries were stored for 34 days, instead of 14 days, as was done in Examples 1a and 1b. Referring now to Table 3, electrical capacity to the cut-off voltage of 0.8 V for zinc-air cells with anodes containing 200 ppm PEG (cells 3-1 to 3-3) averaged 3.51 Ah, compared to cells containing 500 ppm PEG BCME (cells 3-4 to 3-6), which averaged 3.69 Ah. Average electrical potential measurements of Vplat and Vdip were also higher for zinc-air cells with anodes containing PEG BCME at 0.96 V and 0.94 V, respectively, as compared to 0.95 V and 0.90 V for cells with anodes containing PEG. Thus, cells with anodes containing PEG BCME exhibited superior electrochemical properties in comparison to cells having anodes containing PEG.

Example 3(a)

Zinc-air cells with anode mixtures containing PEG at 200 ppm or PEG BCME at 500 ppm were stored for 14 days, and the effectiveness of the corrosion inhibitors measured at room temperature. Measurements were made at analog discharge mode (0.47 A).

TABLE 4

| Cell | Corrosion Inhibitor | Capacity to 0.9 V Cut-off (Ah) | | Potential (v) | |
|---|---|---|---|---|---|
| | | Raw Data | Mean | Raw Data | Mean |
| 4-1 | PEG (200 ppm) | 3.37 | 3.45 | 1.08 | 1.103 |
| 4-2 | PEG (200 ppm) | 3.52 | | 1.14 | |
| 4-3 | PEG (200 ppm) | 3.47 | | 1.09 | |
| 4-4 | PEG BCME (500 ppm) | 3.71 | 3.69 | 1.11 | 1.11 |
| 4-5 | PEG BCME (500 ppm) | 3.71 | | 1.11 | |
| 4-6 | PEG BCME (500 ppm) | 3.66 | | 1.11 | |

In this Example, the experimental conditions were identical to those of Example 1(a). In this case the cells were tested in the analog discharge mode. Referring now to Table 4, the average electrical capacity to the cut-off voltage of 0.9 V was 3.69 Ah for cells containing 500 ppm PEG BCME. This value was greater than the average measurement for electrical capacity for cells with anodes containing 200 ppm PEG (3.45 Ah). Average potential measurements also were slightly higher for cells with anodes containing 500 ppm PEG BCME than for cells with anodes containing 200 ppm PEG.

Example 3(b)

Zinc-air cells with anodes containing PEG at 500 ppm were directly compared to cells with anodes containing 500 ppm PEG BCME. The cells were stored for 14 days, and then the effectiveness of the corrosion inhibitors was measured at room temperature. Measurements were made at analog discharge mode (0.47 A).

TABLE 5

| Cell | Corrosion Inhibitor | Capacity to 0.9 V Cut-off (Ah) | | Potential (V) | |
|---|---|---|---|---|---|
| | | Raw Data | Mean | Raw Data | Mean |
| 5-1 | PEG (500 ppm) | 3.17 | 3.17 | 1.06 | 1.08 |
| 5-2 | PEG (500 ppm) | 3.06 | | 1.08 | |
| 5-3 | PEG (500 ppm) | 3.27 | | 1.09 | |
| 5-4 | PEG BCME (500 ppm) | 3.71 | 3.69 | 1.11 | 1.11 |
| 5-5 | PEG BCME (500 ppm) | 3.71 | | 1.11 | |
| 5-6 | PEG BCME (500 ppm) | 3.66 | | 1.11 | |

In this Example, cells with anodes containing PEG at 500 ppm or PEG BCME at 500 ppm were tested, using the analog discharge mode. Referring now to Table 5, the average electrical capacity to the cut-off voltage of 0.9 V was 3.69 Ah for cells with anodes containing 500 ppm PEG BCME, which was greater than the average measurement of 3.17 Ah for cells with anodes containing 500 ppm PEG. Average measurements of electrical potential for cells with anodes containing PEG BCME were 1.11 V, as compared to 1.08 V for cells with anodes containing PEG.

Example 3(c)

Zinc-air cells containing PEG or PEG BCME at 200 ppm in the anode mixture were stored for 14 days, then measured in analog discharge mode (0.47 A) at room temperature.

TABLE 6

| Cell | Corrosion Inhibitor | Capacity to 0.9 V Cut-off (Ah) | | Potential (V) | |
|---|---|---|---|---|---|
| | | Raw Data | Mean | Raw Data | Mean |
| 6-1 | PEG (200 ppm) | 3.37 | 3.48 | 1.06 | 1.08 |
| 6-2 | PEG (200 ppm) | 3.61 | | 1.08 | |
| 6-3 | PEG (200 ppm) | 3.47 | | 1.09 | |
| 6-4 | PEG BCME (200 ppm) | 3.74 | 3.76 | 1.14 | 1.14 |
| 6-5 | PEG BCME (200 ppm) | 3.77 | | 1.12 | |
| 6-6 | PEG BCME (200 ppm) | 3.76 | | 1.15 | |

In Example 3(c), the experimental conditions were the same as in Examples 3(a) and 3(b), except that the corrosion inhibitors were present at a concentration of 200 ppm. Referring to Table 6, the average electrical capacity to the cut-off voltage of 0.9 V was higher for cells containing 200 ppm PEG BCME (3.76 Ah) compared to cells containing 200 ppm PEG (3.48 Ah). The average potential measurement for cells containing PEG BCME, at 1.14 V, was lower than that for cells containing PEG (1.08 V).

Taken together, Examples 3(b) and 3(c) demonstrate that at the same concentrations, zinc-air batteries containing PEG BCME as a corrosion inhibitor in the anode mixture exhibit superior electrochemical properties to those of zinc-air batteries containing PEG. At concentrations of both 200 and 500 ppm, zinc-air batteries containing PEG BCME in the anode mixture exhibited higher capacity and working potential measurements than zinc-air batteries containing PEG.

Example 4

Zinc-air cells containing PEG at 200 ppm or PEG BCME at 500 ppm in the anode mixtures were stored for 34 days, and the effectiveness of the corrosion inhibitors was then measured at room temperature. Measurements were made in an analog discharge mode (0.47 A).

TABLE 7

| Cell | Corrosion Inhibitor | Z 1khz (Ohms) | | Capacity to 0.9 V Cut-off (Ah) | | Potential (V) | |
|---|---|---|---|---|---|---|---|
| | | Raw Data | Mean | Raw Data | Mean | Raw Data | Mean |
| 7-1 | PEG (200 ppm) | 0.11 | 0.104 | 3.37 | 3.45 | 1.06 | 1.07 |
| 7-2 | PEG (200 ppm) | 0.10 | | 3.51 | | 1.08 | |
| 7-3 | PEG (200 ppm) | 0.10 | | 3.47 | | 1.08 | |
| 7-4 | PEG BCME (500 ppm) | 0.105 | 0.105 | 3.71 | 3.69 | 1.10 | 1.09 |
| 7-5 | PEG BCME (500 ppm) | 0.10 | | 3.71 | | 1.09 | |
| 7-6 | PEG BCME (500 ppm) | 0.11 | | 3.66 | | 1.09 | |

In Example 4, zinc-air cells containing PEG or PEG BCME at 500 ppm in the zinc anode mixture were stored for 34 days, then measured in an analog discharge mode. Referring now to Table 7, the average electrical capacity to the cut-off voltage of 0.9 V for cells containing 500 ppm PEG BCME in the anode mixture averaged 3.69 Ah (cells 7-4 to 7-6), compared to 3.45 Ah for cells containing PEG in the anode mixture (cells 7-1 to 7-3). The average potential measurement for cells containing PEG BCME, at 1.09 V, was higher than that of cells containing PEG, which averaged 1.07 V.

Example 5(a)

Zinc-air cells containing PEG at 200 ppm or PEG BCME at 500 ppm were stored for 16 days, and then the effectiveness of the corrosion inhibitors was measured at 0° C. under GSM discharge mode (0.2 A for 3.6 msec+2 A for 0.4 msec).

TABLE 8

| Cell | Corrosion Inhibitor | Capacity to 0.5 V Cut-off (Ah) | | Capacity to 0.8 V Cut-off (Ah) | | Vplat (V) | | Vdip (V) | |
|---|---|---|---|---|---|---|---|---|---|
| | | Raw Data | Mean | Raw Data | Mean | Raw Data | Mean | Raw Data | Mean |
| 8-1 | PEG (200 ppm) | 2.6 | 2.68 | 1.3 | 1.10 | 0.83 | 0.82 | 0.82 | 0.81 |
| 8-2 | PEG (200 ppm) | 2.75 | | 0.37 | | 0.80 | | 0.79 | |
| 8-3 | PEG (200 ppm) | 2.69 | | 1.64 | | 0.83 | | 0.82 | |
| 8-4 | PEG BCME (500 ppm) | 2.78 | 2.68 | 1.63 | 1.18 | 0.83 | 0.82 | 0.82 | 0.81 |
| 8-5 | PEG BCME (500 ppm) | 2.71 | | 1.51 | | 0.83 | | 0.82 | |
| 8-6 | PEG BCME (500 ppm) | 2.53 | | 0.41 | | 0.79 | | 0.78 | |

Referring now to Table 8, the average electrical capacity to the cut-off voltage of 0.5 V was the same for zinc-air cell anode mixtures containing 500 ppm of PEG BCME and for cells containing 200 ppm of PEG (2.68 Ah) at 0° C. However, the average capacity to the cut-off voltage of 0.8 V for zinc-air cells containing PEG BCME (cells 8-4 to 8-6) was higher than that of zinc-air cells containing PEG (cells 8-1 to 8-3) (1.18 Ah versus 1.10 Ah). If the aberrant capacity measurements obtained in cells 8-2 and 8-6 are disregarded, the differences between the capacity measurements of the two types of cells become even greater (1.57 Ah versus 1.47 Ah). At 0° C., there was no difference between the cells in the average potential measurements Vplat and Vdip.

Example 5(b)

Zinc-air cells containing 500 ppm PEG or 500 ppm PEG BCME were stored for 16 days, then measured under the GSM discharge mode (0.2 A for 3.6 msec+2 A for 0.4 msec) at 0° C.

TABLE 9

| Cell | Corrosion Inhibitor | Capacity to 0.5 V Cut-off (Ah) | | Vplat (V) | | Vdip (V) | |
|---|---|---|---|---|---|---|---|
| | | Raw Data | Mean | Raw Data | Mean | Raw Data | Mean |
| 9-1 | PEG (500 ppm) | 1.47 | 1.44 | 0.82 | 0.81 | 0.83 | 0.82 |
| 9-2 | PEG (500 ppm) | 1.4 | | 0.79 | | 0.8 | |
| 9-3 | PEG BCME (500 ppm) | 2.71 | 2.62 | 0.82 | 0.82 | 0.83 | 0.83 |
| 9-4 | PEG BCME (500 ppm) | 2.53 | | 0.82 | | 0.83 | |

Example 5(b) employed the same experimental conditions as were used in Example 5(a), except that PEG and PEG BCME were each added to a concentration of 500 ppm. Referring now to Table 9, the average capacity to the cut-off voltage of 0.5 V for zinc-air cells with anode mixtures containing PEG BCME measured 2.62 Ah, as compared to 1.44 Ah for zinc-air cells with anode mixtures containing PEG. Potential measurements, both Vplat and Vdip, were slightly higher on average for zinc-air cells containing PEG BCME as compared to zinc-air cells containing PEG. Thus, in cells measured at 0° C., differences were seen between zinc-air cells containing PEG BCME and cells containing PEG in the measurement in electrical capacity, but there was little or no difference in electrical potential.

Example 5(c)

Zinc-air cells containing PEG or PEG BCME at 200 ppm were stored for 16 days, then measured in a GSM discharge mode (0.2 A for 3.6 msec+2 A for 0.4 msec) at 0° C.

TABLE 10

| Cell | Corrosion Inhibitor | Capacity to 0.5 V Cut-off (Ah) | | Vplat (V) | | Vdip (V) | |
|---|---|---|---|---|---|---|---|
| | | Raw Data | Mean | Raw Data | Mean | Raw Data | Mean |
| 10-1 | PEG (200 ppm) | 2.6 | 2.68 | 0.82 | 0.81 | 0.83 | 0.82 |
| 10-2 | PEG (200 ppm) | 2.75 | | 0.79 | | 0.8 | |
| 10-3 | PEG (200 ppm) | 2.69 | | 0.82 | 0.89 | 0.83 | 0.90 |
| 10-4 | PEG BCME (200 ppm) | 2.92 | 2.90 | 0.87 | | 0.88 | |
| 10-5 | PEG BCME (200 ppm) | 2.87 | | 0.90 | | 0.92 | |

Example 5(c) employed the same experimental conditions as in Examples 5(a) and 5(b), except that PEG and PEG BCME were each tested at a concentration of 200 ppm. Referring now to Table 10, zinc-air cells with anodes containing PEG BCME exhibited superior electrochemical measurements to those of zinc-air cells with anodes containing PEG. The average capacity to the cut-off voltage of 0.5 V for cells containing PEG BCME measured 2.90 Ah on average, as compared to only 2.68 Ah for the average measurement for cells containing PEG. Potential measurements, both Vplat and Vdip, were also higher on average for zinc-air cells containing PEG BCME than for zinc-air cells containing PEG. Taken together, Examples 5(a), 5(b) and 5(c) demonstrate that whether the cells were tested at the same concentrations or at different concentrations of PEG BCME or PEG, zinc-air cells containing PEG BCME exhibited superior electrochemical properties to those of zinc-air cells containing PEG, even when measurements were made at 0° C.

Example 6

Zinc-air cells containing PEG at 200 ppm or PEG BCME at 500 ppm were stored for 17 days. Measurements were made in a GSM discharge mode (0.2 A for 3.6 msec+2 A for 0.4 msec) at 5° C.

TABLE 11

| Cell | Corrosion Inhibitor | Capacity to 0.5 V Cut-off (Ah) | | Capacity to 0.8 V Cut-off (Ah) | | Vplat (V) | | Vdip (V) | |
|---|---|---|---|---|---|---|---|---|---|
| | | Raw Data | Mean | Raw Data | Mean | Raw Data | Mean | Raw Data | Mean |
| 11-1 | PEG (200 ppm) | 2.68 | 2.72 | 0.4 | 1.20 | 0.8 | 0.82 | 0.79 | 0.81 |
| 11-2 | PEG (200 ppm) | 2.66 | | 1.6 | | 0.83 | | 0.82 | |
| 11-3 | PEG (200 ppm) | 2.80 | | 1.6 | | 0.83 | | 0.82 | |

TABLE 11-continued

| Cell | Corrosion Inhibitor | Capacity to 0.5 V Cut-off (Ah) | | Capacity to 0.8 V Cut-off (Ah) | | Vplat (V) | | Vdip (V) | |
|---|---|---|---|---|---|---|---|---|---|
| | | Raw Data | Mean | Raw Data | Mean | Raw Data | Mean | Raw Data | Mean |
| 11-4 | PEG BCME (500 ppm) | 2.83 | 2.78 | 1.85 | 1.85 | 0.84 | 0.85 | 0.83 | 0.84 |
| 11-5 | PEG BCME (500 ppm) | 2.86 | | 2.0 | | 0.86 | | 0.85 | |
| 11-6 | PEG BCME (500 ppm) | 2.65 | | 1.7 | | 0.84 | | 0.83 | |

In this Example, zinc-air cells were stored for 17 days, then measured in a GSM discharge mode (0.2 A for 3.6 msec+2 A for 0.4 msec) at 5° C. Referring now to Table 11, average measurements for capacity to 0.5 V cut-off for cells containing PEG (500 ppm) were 2.71 Ah, whereas the average capacity measurement for cells containing PEG BCME was 2.78 Ah. The superior electrical property performance of zinc-air cells containing PEG BCME was demonstrated even more dramatically at capacity to 0.8V cut-off. The average measurement of capacity to 0.8 V cut-off in cells containing PEG was only 1.20 Ah, as compared to that of cells containing PEG BCME, which was 1.85 Ah. Average potential measurements, both Vplat and Vdip, were also higher for zinc-air cells containing PEG BCME than for zinc-air cells containing PEG. The Vplat measurement for cells containing PEG BCME was 0.85 V, while that of cells containing PEG was only 0.82 V. The Vdip measurements for PEG BCME- and PEG-containing cells were 0.84 V and 0.81 V, respectively.

Example 7

Zinc-air cells containing PEG at 200 ppm or PEG BCME at 500 ppm were stored for 18 days, then measured in a GSM discharge mode (0.2 A for 3.6 msec+2 A for 0.4 msec) at 0° C.

TABLE 12

| Cell | Corrosion Inhibitor | Capacity to 0.5 V Cut-off (Ah) | | Capacity to 0.8 V Cut-off (Ah) | | Vplat (V) | | Vdip (V) | |
|---|---|---|---|---|---|---|---|---|---|
| 12-1 | PEG (200 ppm) | 2.76 | 2.91 | 2.29 | 2.41 | 0.87 | 0.88 | 0.85 | 0.86 |
| 12-2 | PEG (200 ppm) | 2.94 | | 2.40 | | 0.87 | | 0.85 | |
| 12-3 | PEG (200 ppm) | 3.03 | | 2.55 | | 0.90 | | 0.87 | |
| 12-4 | PEG BCME (500 ppm) | 3.22 | 3.10 | 2.83 | 2.61 | 0.92 | 0.91 | 0.91 | 0.90 |
| 12-5 | PEG BCME (500 ppm) | 3.08 | | 2.62 | | 0.90 | | 0.89 | |
| 12-6 | PEG BCME (500 ppm) | 3.00 | | 2.37 | | 0.90 | | 0.89 | |

In this Example, zinc-air cells containing 200 ppm PEG or 500 ppm PEG BCME were stored for 18 days, then measured in a GSM discharge mode (0.2 A for 3.6 msec+2 A for 0.4 msec) at 10° C. Referring now to Table 12, the average capacity to the cut-off voltage of 0.5 V was greater for zinc-air cells containing PEG BCME than for zinc-air cells containing PEG (3.10 Ah versus 2.91 Ah). Similarly, the average measurement for capacity to 0.8 V cut-off was also greater for zinc-air cells containing PEG BCME (2.61 Ah) than for zinc-air cells containing PEG (2.41 Ah). Finally, the average potential measurements, Vplat and Vdip, were both greater for zinc-air cells containing PEG BCME than for zinc-air cells containing PEG.

Example 8

Zinc-air cells with anodes containing PEG at 200 ppm or PEG BCME at 500 ppm were stored for 24 days, then measured in an analog discharge mode (0.47 A) at −5° C.

TABLE 13

| Cell | Corrosion Inhibitor | Capacity to 0.5 V Cut-off (Ah) | | Capacity to 0.9 V Cut-off (Ah) | | Potential (V) | |
|---|---|---|---|---|---|---|---|
| | | Raw Data | Mean | Raw Data | Mean | Raw Data | Mean |
| 13-1 | PEG (200 ppm) | 1.19 | 1.65 | 0.40 | 0.53 | 0.88 | 0.87 |
| 13-2 | PEG (200 ppm) | 2.17 | | 0.90 | | 0.90 | |
| 13-3 | PEG (200 ppm) | 1.61 | | 0.30 | | 0.85 | |
| 13-4 | PEG BCME (500 ppm) | 2.28 | 2.17 | 1.29 | 0.88 | 0.92 | 0.91 |
| 13-5 | PEG BCME (500 ppm) | 2.15 | | 0.84 | | 0.9 | |
| 13-6 | PEG BCME (500 ppm) | 2.09 | | 0.50 | | 0.9 | |

In this Example, the zinc-air cells were stored for 24 days, then tested in analog discharge mode (0.47 A) at −5° C. Referring to Table 13, the average measurement of capacity to the cut-off voltage of 0.5 V for zinc-air cells containing PEG BCME averaged 2.17 Ah, as compared to 1.66 Ah for zinc-air cells containing PEG. The average capacity to 0.9 V cut-off was also higher for zinc-air cells containing PEG BCME (0.88 Ah) than for cells containing PEG (0.53 Ah). Average potential measurements were also higher for cells containing PEG BCME than for cells containing PEG. Cells with anodes containing PEG BCME had an average potential measurement of 0.91 V, while cells with anodes containing PEG had an average potential measurement of 0.87 V.

Example 9

Zinc-air cells with anodes containing PEG at 200 ppm or PEG BCME at 500 ppm were stored for 24 days, then measured in an analog discharge mode (0.47 A) at 0° C.

TABLE 14

| Cell | Corrosion Inhibitor | Capacity to 0.5 V Cut-off (Ah) | | Capacity to 0.9 V Cut-off (Ah) | | Potential (V) | |
|---|---|---|---|---|---|---|---|
| | | Raw Data | Mean | Raw Data | Mean | Raw Data | Mean |
| 14-1 | PEG (200 ppm) | 2.46 | 2.43 | 1.68 | 1.58 | 0.95 | 0.94 |
| 14-2 | PEG (200 ppm) | 2.55 | | 1.72 | | 0.95 | |
| 14-3 | PEG (200 ppm) | 2.27 | | 1.34 | | 0.93 | |
| 14-4 | PEG BCME (500 ppm) | 2.59 | 2.55 | 1.92 | 1.77 | 0.98 | 0.97 |
| 14-5 | PEG BCME (500 ppm) | 2.58 | | 1.79 | | 0.98 | |
| 14-6 | PEG BCME (500 ppm) | 2.47 | | 1.59 | | 0.95 | |

In this Example, the zinc-air cells were stored for 23 days, then tested in analog discharge mode (0.47 A) at 0° C. Referring to Table 14, the average measurement of capacity to the cut-off voltage of 0.9 V was 1.77 Ah for zinc-air cells containing 500 ppm PEG BCME, as compared to an average measurement of 1.58 Ah for cells containing 200 ppm PEG. Average capacity measurement to 0.5 V cut-off was greater for cells containing PEG BCME than for cells containing PEG (2.55 Ah versus 2.43 Ah). Lastly, the average potential measurement was higher for cells containing PEG BCME than for cells containing PEG.

Example 10

Zinc-air cells containing PEG at 200 ppm or PEG BCME at 500 ppm were stored for 22 days, then measured in an analog discharge mode (0.47 A) at −5° C.

TABLE 15

| Cell | Corrosion Inhibitor | Capacity to 0.5 V Cut-off (Ah) | | Capacity to 0.9 V Cut-off (Ah) | | Potential (V) | |
|---|---|---|---|---|---|---|---|
| | | Raw Data | Mean | Raw Data | Mean | Raw Data | Mean |
| 15-1 | PEG (200 ppm) | 2.68 | 2.65 | 2.14 | 2.02 | 1.00 | 0.99 |
| 15-2 | PEG (200 ppm) | 2.71 | | 2.18 | | 1.00 | |
| 15-3 | PEG (200 ppm) | 2.57 | | 1.74 | | 0.96 | |
| 15-4 | PEG BCME (500 ppm) | 2.80 | 2.75 | 2.30 | 2.18 | 1.02 | 1.01 |
| 15-5 | PEG BCME (500 ppm) | 2.78 | | 2.17 | | 1.01 | |
| 15-6 | PEG BCME (500 ppm) | 2.67 | | 2.06 | | 1.01 | |

In this Example, zinc-air batteries were stored for 22 days and the electrical properties measured in the analog discharge mode (0.47 A) at −5° C. Referring to Table 15, higher average measurements for capacity to the cut-off voltage of 0.5 V were obtained for zinc-air batteries containing PEG BCME than for zinc-air batteries containing PEG (2.75 Ah versus 2.65 Ah). Also, a higher average measurement was obtained for capacity to 0.9 V cut-off for cells containing 500 ppm PEG BCME than for cells containing 200 ppm PEG. Average potential measurements were higher for cells containing PEG BCME at 1.01 V, as compared to 0.99 V for cells containing PEG.

Example 11

Zinc-air cells containing PEG at 200 ppm or PEG BCME at 500 ppm were stored for 21 days, then measured in an analog discharge mode (0.47 A) at −10° C.

TABLE 16

| Cell | Corrosion Inhibitor | Capacity to 0.5 V Cut-off (Ah) | | Capacity to 0.9 V Cut-off (Ah) | | Potential (V) | |
|---|---|---|---|---|---|---|---|
| | | Raw Data | Mean | Raw Data | Mean | Raw Data | Mean |
| 16-1 | PEG (200 ppm) | 2.82 | 2.85 | 2.48 | 2.51 | 1.02 | 1.02 |
| 16-2 | PEG (200 ppm) | 2.81 | | 2.42 | | 1.02 | |
| 16-3 | PEG (200 ppm) | 2.93 | | 2.62 | | 1.03 | |
| 16-4 | PEG BCME (500 ppm) | 3.10 | 3.00 | 2.80 | 2.65 | 1.05 | 1.04 |
| 16-5 | PEG BCME (500 ppm) | 3.00 | | 2.71 | | 1.05 | |
| 16-6 | PEG BCME (500 ppm) | 2.91 | | 2.44 | | 1.02 | |

In this Example, zinc-air batteries were stored for 21 days and then measured in an analog discharge mode (0.47 A) at −10° C. Referring to Table 16, average measurements for capacity to the cut-off voltage of 0.5 V were higher for cells containing PEG BCME (3.00 Ah) than for cells containing PEG (2.85 Ah). Average measurements for capacity to 0.9 V cut-off were also higher for cells containing PEG BCME (2.65 Ah) than for cells containing PEG (2.51 Ah). The average potential measurement were again higher for cells containing PEG BCME as than for cells containing PEG.

Example 12

Zinc-air cells containing PEG at 200 ppm or PEG BCME at 500 ppm were stored for 7 days at 71° C., then measured in a GSM discharge mode (0.2 A for 3.6 msec+2 A for 0.4 msec) at 10° C. In this Example, duplicate rather than triplicate experiments were performed.

TABLE 17

| Cell | Corrosion Inhibitor | Capacity to 0.5 V Cut-off (Ah) | | Capacity to 0.8 V Cut-off (Ah) | | Vplat (V) | | Vdip (V) | |
|---|---|---|---|---|---|---|---|---|---|
| | | Raw Data | Mean | Raw Data | Mean | Raw Data | Mean | Raw Data | Mean |
| 17-1 | PEG (200 ppm) | 2.27 | 2.42 | 0.25 | 0.25 | 0.76 | 0.765 | 0.75 | 0.76 |
| 17-2 | PEG (200 ppm) | 2.57 | | 0.25 | | 0.77 | | 0.76 | |
| 17-3 | PEG BCME (500 ppm) | 2.64 | 2.56 | 1.83 | 1.57 | 0.83 | 0.82 | 0.82 | 0.81 |
| 17-4 | PEG BCME (500 ppm) | 2.48 | | 1.32 | | 0.81 | | 0.80 | |

In this Example, the zinc-air cells were stored for 7 days at 71° C., then were measured in a the GSM discharge mode (0.2 A for 3.6 msec+2 A for 0.4 msec) at 10° C. Referring now to Table 17, the average measurement of capacity to the cut-off voltage of 0.8 V for cells containing PEG BCME was 1.57 Ah, as opposed to only 0.25 Ah for cells containing PEG. For measurements of capacity to 0.5 V cut-off, the average measurement for cells containing PEG BCME was 2.56 Ah, as compared to 2.42 Ah for cells containing PEG. Potential measurement averages, for both Vplat and Vdip, were again higher for cells containing PEG than for cells containing PEG. Cells containing 500 ppm PEG BCME produced an average Vplat measurement of 0.82 V, while cells containing 200 ppm PEG produced a lower average Vplat measurement of 0.765 V.

Example 13

Example 13 compares corrosion rates, as tested at 50° C. after storage for various periods of time from 22 days to 28 days at room temperature, and also for 7 days at 71° C. Corrosion rates were determined hourly by measuring the amount of hydrogen produced over a ten-hour period. The corrosion rate was determined from a graph of hydrogen concentration versus time, and the resultant slope corresponds to the corrosion rate. From the amount of hydrogen gas evolved, the amount of zinc lost (therefore the corrosion rate) was also calculated.

TABLE 18

| Cell Type | % Discharge | Storage Condition | Corr. Rate (%/wk.) | Corr. Rate (%/wk.) MEAN |
|---|---|---|---|---|
| PEG BCME (200 ppm) | 0 | 22d at RT | 0.033 0.035 | 0.034 |
| PEG (500 ppm) | 0 | 22d at RT | 0.015 0.015 | 0.015 |
| PEG BCME | 0 | 22d at RT | 0.01 0.012 0.023 | 0.015 |
| PEG | 0 | 22d at RT | 0.02 0.014 0.018 | 0.0173 |
| PEG BCME | 20 | 23d at RT | 0.044 0.044 0.047 | 0.045 |

TABLE 18-continued

| Cell Type | % Discharge | Storage Condition | Corr. Rate (%/wk.) | Corr. Rate (%/wk.) MEAN |
|---|---|---|---|---|
| PEG | 20 | 23d at RT | 0.051 | 0.072 |
|  |  |  | 0.08 |  |
|  |  |  | 0.086 |  |
| PEG BCME | 50 | 27d at RT | 0.07 | 0.0946 |
|  |  |  | 0.095 |  |
|  |  |  | 0.116 |  |
| PEG | 50 | 27d at RT | 0.18 | 0.1866 |
|  |  |  | 0.10 |  |
|  |  |  | 0.28 |  |
| PEG BCME | 85 | 28d at RT | 0.35 | 0.2966 |
|  |  |  | 0.31 |  |
|  |  |  | 0.23 |  |
| PEG | 85 | 28d at RT | 0.97 | 0.7733 |
|  |  |  | 0.41 |  |
|  |  |  | 0.94 |  |
| PEG BCME | 0 | 7d at 71° C. | 0.016 | 0.0233 |
|  |  |  | 0.014 |  |
|  |  |  | 0.04 |  |
| PEG | 0 | 7d at 71° C. | 0.034 | 0.0245 |
|  |  |  | 0.015 |  |

As expected, referring now to Table 18, the corrosion rates increased with longer storage times for both cells containing PEG BCME and cells containing PEG. However, in general corrosion rates for cells containing PEG BCME were significantly lower than those for cells containing PEG. The only exception was seen in for measurements after 22 days of storage. At concentrations of 200 ppm, the average corrosion rates for cells containing PEG after 22 days was actually lower for PEG (0.017%) than for cells containing PEG BCME (0.031%). And at concentrations of 500 ppm, the average corrosion rates were the same.

After storage periods greater than 22 days, however, corrosion rates decreased significantly for cells containing PEG BCME as compared to cells containing PEG. Average corrosion rates for cells containing PEG after 23 days, 27 days, and 28 days of storage at room temperature were 0.235, 0.187, and 0.773, respectively, whereas the corresponding average corrosion rates for cells containing PEG BCME were 0.015, 0.045, and 0.094, respectively. Thus, adding PEG-BCME as a corrosion inhibitor to a zinc-air battery significantly reduces the rate of corrosion.

Generally, as noted above, batteries with lower corrosion rates also have poorer electrochemical measurements. Surprisingly, however, as demonstrated in Examples 1–12 above, cells containing PEG BCME have improved electrochemical measurements, in comparison with cells containing PEG, even though these cells also have lower corrosion rates than cells containing PEG. Cells containing PEG BCME exhibited higher capacity and potential measurements, regardless of the mode of measurement or the length of storage.

TABLE 19

| Gel Type (ppm) | Corr. Rate - %/wk. @ 50° C. | |
|---|---|---|
| PEG (200 ppm) | 0.020 | 0.036 |
| PEG BCME (500 ppm) | 0.014 | 0.019 |
| PEG BCME (1500 ppm) | 0.010 | 0.0074 |
| PEG BCME (5000 ppm) | 0.008 | 0.010 |

Furthermore, it can also be seen that the corrosion rate of cells containing PEG BCME decreases with increasing PEG BCME concentration (Table 19). The rate of corrosion for cells containing PEG BCME at 5000 ppm is slower than the corrosion rates for cells containing PEG BCME at 1500 ppm and 500 ppm.

These results from these Examples and Tables clearly demonstrate that PEG BCME is superior over prior art PEG in reducing corrosion in zinc-air cells. Capacity, working potential, cell expansion, shelf life, and stability of zinc-air cells are significantly improved by adding PEG BCME to the zinc anode.

Although the invention herein has been described with reference to particular embodiments, it is to be understood that these embodiments are merely illustrative of various aspects of the invention. Thus, those of skill in the art would understand that various modifications may be made in the illustrative embodiments and other arrangements may be devised without departing from the spirit and scope of the invention. Throughout this application various publications, patents and applications are cited. The entire contents of these publications, patents and applications are hereby incorporated by reference into the present application.

We claim:

1. A metal-alkaline battery cell comprising:
a cathode including a catalyst and a conductive material;
a first terminal electrically connected to the cathode;
a mixture comprising an electrolyte, a metal, and a PEG derivative, said electrolyte comprising at least one ion, said PEG derivative having a hydrophilic moiety replacing at least one terminal hydroxyl group of a PEG molecule, wherein said PEG derivative is polyethylene glycol bicarboxy methyl ether (PEG BCME);
a second terminal electrically connected to said mixture; and
a separator, said separator being in contact with each of said cathode and said mixture while separating said cathode and said mixture from each other, and allowing said at least one ion in said electrolyte to travel between said mixture and said cathode.

2. The metal-alkaline battery according to claim 1, wherein PEG BCME is present in said mixture at a concentration between about 50 ppm and about 5,000 ppm.

3. The metal-alkaline battery according to claim 1, wherein PEG BCME is present in said mixture at a concentration between about 200 ppm and about 1,500 ppm.

4. The metal-alkaline battery according to claim 1, wherein PEG BCME is present in said mixture at a concentration between about 200 ppm and about 500 ppm.

5. The metal-alkaline battery according to claim 1, wherein PEG BCME has a chemical formula of $HO_2CCH_2O-(CH_2-CH_2-O)_n-CH_2CO_2H$, and n is in a range between 5 and 50.

6. The metal-alkaline battery according to claim 1, wherein PEG BCME has a chemical formula of $HO_2CCH_2O-(CH_2-CH_2-O)_n-CH_2CO_2H$, and n=11.

7. The metal-alkaline battery according to claim 1, wherein PEG BCME has a molecular weight in a range between about 200 and 2,000.

8. The metal-alkaline battery according to claim 1, wherein PEG BCME has a molecular weight of about 600.

9. A zinc-air battery cell comprising:
a first terminal electrically connected to an air electrode;
a mixture comprising an electrolyte, zinc metal particles, and PEG BCME, said electrolyte comprising at least one ion;
a second terminal electrically connected to said mixture; and a separator, said separator being in contact with each of said electrode and said mixture while separating said electrode and said mixture from each other, and allowing said at least one ion in said electrolyte to travel between said mixture and said electrode.

10. The zinc-air battery according to claim 9, wherein PEG BCME is present in said mixture at a concentration between about 50 ppm and about 5,000 ppm.

11. The zinc-air battery according to claim 9, wherein PEG BCME is present in said mixture at a concentration between about 200 ppm and about 1,500 ppm.

12. The zinc-air battery according to claim 9, wherein PEG BCME is present in said mixture at a concentration between about 200 ppm and about 500 ppm.

13. The zinc-air battery according to claim 9, wherein PEG BCME has a chemical formula of $HO_2CCH_2O-(CH_2-CH_2-O)_n-CH_2CO_2H$, and n is in a range between 5 and 50.

14. The zinc-air battery according to claim 9, wherein PEG BCME has a chemical formula of $HO_2CCH_2O-(CH_2-CH_2-O)_n-CH_2CO_2H$, and n=11.

15. The zinc-air battery according to claim 9, wherein PEG BCME has a molecular weight in a range between about 200 and 2,000.

16. The zinc-air battery according to claim 9, wherein PEG BCME has a molecular weight of about 600.

17. A method of making a metal-air battery cell, comprising the steps of:

obtaining an air electrode with a first terminal connected thereto;

mixing an electrolyte, metal particles, and PEG BCME to create a mixture, said electrolyte comprising at least one ion;

electrically connecting a second terminal to said mixture; and positioning a separator between said air electrode and said mixture, said separator being in physical contact with said air electrode and with said mixture while separating said electrode and said mixture from each other, and allowing said at least one ion to travel between said air electrode and said mixture.

18. The method of claim 17, wherein said metal particles are zinc particles.

19. The method of claim 17, wherein PEG BCME is present in said mixture at a concentration between about 50 ppm and about 5,000 ppm.

20. The method of claim 17, wherein PEG BCME is present in said mixture at a concentration between about 200 ppm and about 1,500 ppm.

21. The method of claim 17, wherein PEG BCME is present in said mixture at a concentration between 200 ppm and 500 ppm.

22. The method of claim 17, wherein PEG BCME has a chemical formula of $HO_2CCH_2O-(CH_2-CH_2-O)_n-CH_2CO_2H$, and n is in a range between 5 and 50.

23. The method of claim 17, wherein PEG BCME has a chemical formula of $HO_2CCH_2O-(CH_2-CH_2-O)_n-CH_2CO_2H$, and n=11.

24. The method of claim 17, wherein said PEG BCME has a molecular weight in a range between about 200 and 2,000.

25. The method of claim 17, wherein said PEG BCME has a molecular weight of about 600.

* * * * *